United States Patent
Aher et al.

(10) Patent No.: US 11,228,750 B1
(45) Date of Patent: Jan. 18, 2022

(54) SYSTEMS AND METHODS FOR GENERATING VIRTUAL REALITY SCENES

(71) Applicant: Rovi Guides, Inc., San Jose, CA (US)

(72) Inventors: Ankur Anil Aher, Maharashtra (IN); Susanto Sen, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/014,732

(22) Filed: Sep. 8, 2020

(51) Int. Cl.
*H04N 13/183* (2018.01)
*H04N 13/194* (2018.01)
*H04N 13/178* (2018.01)
*G06F 40/205* (2020.01)

(52) U.S. Cl.
CPC ......... *H04N 13/183* (2018.05); *G06F 40/205* (2020.01); *H04N 13/178* (2018.05); *H04N 13/194* (2018.05)

(58) Field of Classification Search
CPC .. H04N 13/183; H04N 13/194; H04N 13/178; G06F 40/205
See application file for complete search history.

(56) References Cited

U.S. PATENT DOCUMENTS

| | | | | |
|---|---|---|---|---|
| 7,962,329 | B1 * | 6/2011 | Coyne | G06T 17/00 704/9 |
| 10,665,030 | B1 * | 5/2020 | Shekhar | G06F 40/205 |
| 2006/0217979 | A1 * | 9/2006 | Pahud | G06T 13/00 704/257 |
| 2009/0219291 | A1 * | 9/2009 | Lloyd | G06T 15/20 345/427 |
| 2012/0162210 | A1 * | 6/2012 | Cabrita | A63F 13/60 345/419 |
| 2014/0002457 | A1 * | 1/2014 | Swindell | G06T 15/60 345/426 |
| 2014/0310595 | A1 * | 10/2014 | Acharya | G06F 3/04842 715/706 |
| 2018/0053284 | A1 * | 2/2018 | Rodriguez | G06T 3/0093 |
| 2018/0203855 | A1 * | 7/2018 | Han | G06F 16/54 |
| 2018/0250593 | A1 * | 9/2018 | Benedetto | A63F 13/47 |
| 2019/0199993 | A1 * | 6/2019 | Babu | G06F 3/00 |

(Continued)

OTHER PUBLICATIONS

Gatteschi, et al., "Semantics-Based Intelligent Human-Computer Interaction," in IEEE Intelligent Systems, vol. 31, No. 4, pp. 11-21, Jul.-Aug. 2016 (Year: 2016).*

(Continued)

*Primary Examiner* — Joseph G Ustaris
*Assistant Examiner* — Jill D Sechser
(74) *Attorney, Agent, or Firm* — Haley Guiliano LLP

(57) ABSTRACT

Systems and methods are disclosed herein for generating virtual reality scenes from a textual document. The textual document is parsed to identify a plurality of text portions corresponding to a plurality of scenes. Each of the plurality of text portions is analyzed to identify a plurality of nouns and a plurality of related verbs. A virtual reality (VR) scene including a plurality of VR objects depicted as performing a set of actions is generated for each of the plurality of text portions, based on the nouns and related verbs identified in the corresponding text portion. Each VR scene includes at least one portal which a user may interact with to view another VR scene and the set of actions in a VR scene may be repeated while the VR scene is being viewed.

18 Claims, 8 Drawing Sheets

(56) References Cited

U.S. PATENT DOCUMENTS

| | | | |
|---|---|---|---|
| 2019/0313059 A1* | 10/2019 | Agarawala | G06F 3/011 |
| 2019/0355175 A1* | 11/2019 | Sipolins | G06F 3/0338 |
| 2019/0362557 A1* | 11/2019 | Lacey | G06F 3/012 |
| 2019/0387220 A1* | 12/2019 | Osmanis | H04N 9/3111 |
| 2020/0013231 A1* | 1/2020 | Maitlen | G06T 19/00 |
| 2020/0151277 A1* | 5/2020 | Fisher | G06F 3/0338 |
| 2020/0334893 A1* | 10/2020 | Jiang | G06F 3/03547 |
| 2021/0084239 A1* | 3/2021 | Pinskaya | H04N 5/2622 |

OTHER PUBLICATIONS

Wickramasinghe, et al., "Virtual reality markup framework for generating interactive indoor environment," 2017 IEEE 3rd International Conference on Engineering Technologies and Social Sciences (ICETSS), Bangkok, Thailand, 2017, pp. 1-6 (Year: 2017).*

Cheng, et al., "A Discrete Event Approach for Scene Generation conditioned on Natural Language," 2019 IEEE International Conference on Robotics and Biomimetics (ROBIO), Dali, China, Dec. 2019, pp. 3048-3053 (Year: 2019).*

* cited by examiner

SYSTEMS AND METHODS FOR GENERATING VIRTUAL REALITY SCENES

BACKGROUND

The present disclosure is directed to techniques for generating virtual reality scenes, and more particularly to techniques for generating virtual reality (VR) scenes from a textual document.

SUMMARY

Electronic devices may generate supplemental visual content corresponding to textual or audio content (e.g., a book, a script, a story, a podcast, etc.) being consumed by a user. However, users may desire a more immersive visual experience. Additionally, users may desire to consume supplemental visual content at their own pace or consume only certain portions of the supplemental visual content.

In one approach, a system may generate supplemental visual content (e.g., 2-D visual content) as a segment that corresponds to the entire text of the textual content (e.g., an electronic book) or text converted from audio content (e.g., an audiobook) that a user wishes to consume. For example, the system may generate a movie based on the entire text of an electronic book. However, in this approach, because the entire text is used to generate the supplemental visual content segment, it may be difficult to store or transfer (e.g., from a server to a user device) the supplemental visual content segment due to storage or network limitations due to the size of the supplemental visual content segment. Additionally, it may be difficult for a user to explore all of the details of the supplemental visual content at their own pace, which may be especially important to a user in, e.g., a VR environment.

In another approach, a system may generate and display supplemental visual content in real time as a user reads textual content (e.g., an electronic book) or listens to audio content (e.g., an audiobook). For example, if a user is reading an electronic book, the system may display, on the page of the electronic book the user is currently reading, 2-D visual content corresponding to the text content on the page. However, in this approach, because visual content is tied to the text on a page of the content (or audio content), the user may not be able to navigate different scenes at their own pace or simultaneously view visual content tied to two different pages of the content. Additionally, it may be difficult for the user to selectively view visual content corresponding to only certain portions of the content (e.g., portions including a particular character).

Accordingly, to solve these problems resulting from generating supplemental visual content as a segment that corresponds to the entire text (or converted text) of content or from generating supplemental visual content tied to the text on a page of the content, techniques are described herein for generating and presenting supplemental visual content as a plurality of separate VR scenes that are navigable by a user at any desired pace or order (e.g., in chronological order or along certain storylines spanning only certain scenes among the plurality of scenes).

One technique disclosed herein includes a system that parses the text of the textual content (i.e., a textual document) to identify a first text portion corresponding to a first scene and a second text portion corresponding to a second scene. Upon identifying the text portions, the system identifies a first plurality of nouns referenced in the first text portion, and a first plurality of verbs related to the first plurality of nouns. The system also identifies a second plurality of nouns referenced in the second text portion, and a second plurality of verbs related to the second plurality of nouns. Based on the first plurality of nouns, the system generates a first VR scene that includes a first plurality of VR objects depicted as performing a first set of actions based on the first plurality of verbs. Based on the second plurality of nouns, the system also generates a second VR scene that includes a second plurality of VR objects depicted as performing a second set of actions based on the second plurality of verbs. While the first VR scene is being viewed, the first set of actions are repeated. The first VR scene includes a first portal that a user uses to navigate from the first VR scene to the second VR scene.

This technique solves the problems described above in the approach where the entire text is used to generate a visual content segment, because it allows a user to continue to view a VR scene (e.g., the first VR scene) until the user has explored all of the details of the VR scene, before navigating to another VR scene (e.g., the second VR scene) at their own pace, and because it allows each of the VR scenes to be generated or sent (e.g., to a user device) individually, thereby reducing the amount of processing, storing, or transmitting resources required to generate and display only certain VR scenes.

This technique also solves the problems described above in the approach where text on the page that a user is currently reading is used to generate visual content to display on the page, because it allows a user to navigate different VR scenes at their own pace or to view a VR scene that is based on text on a plurality of pages (e.g., not only the current page), and because it allows a user to selectively view VR scenes corresponding to only certain portions of the content (e.g., of an electronic book). For example, it allows a user to selectively view VR scenes corresponding to a particular storyline in the content (e.g., a storyline corresponding to a particular character).

Exemplary systems that can be used for generating animated visual content based on text are described by co-pending application Ser. No. 16/363,919 entitled "SYSTEMS AND METHODS FOR CREATING CUSTOMIZED CONTENT," filed on Mar. 25, 2019; co-pending application Ser. No. 16/451,823 entitled "SYSTEMS AND METHODS FOR CREATING CUSTOMIZED CONTENT," filed on Jun. 25, 2019; co-pending application Ser. No. 16/453,841 entitled "SYSTEMS AND METHODS FOR GENERATING SUPPLEMENTAL CONTENT FOR MEDIA CONTENT," filed on Jun. 26, 2019; and co-pending application Ser. No. 16/517,322 entitled "SYSTEMS AND METHODS FOR GENERATING CONTENT FOR A SCREENPLAY," filed on Jul. 19, 2019, which are hereby expressly incorporated by reference herein in their entirety.

In some embodiments, the second set of actions are repeated while the second VR scene is being viewed. The second VR scene may include a second portal. In response to a user interaction with the second portal, viewing of the second VR scene may end, and viewing of the first VR scene may begin. That is, a user may navigate between the VR scenes using portals included in the VR scenes.

In some embodiments, the system may identify a parameter referenced in the second text portion that corresponds to one of the plurality of first nouns and use this identified parameter in the generation of the first VR scene. In some embodiments, the system may identify an adjective associated with one of the first plurality of nouns and use this identified adjective in the generation of the first VR scene.

In some embodiments, the system may generate a first content structure including a first object that matches a first one of the first plurality of nouns. The first object may include a first plurality of attribute table entries based on a second one of the first plurality of nouns and the first plurality of verbs. The first plurality of attribute table entries may be further based on at least one of a first one of the second plurality of nouns and a first one of the second plurality of verbs. The system may generate the first VR scene based on the first content structure.

In some embodiments, the system may parse the textual document to identify a third text portion corresponding to a third scene, identify a third plurality of nouns referenced in the third text portion, and a third plurality of verbs related to the third plurality of nouns, and generate, based on the third plurality of nouns, a third VR scene that includes a third plurality of VR objects depicted as performing a third set of actions based on the third plurality of verbs. In some embodiments, the third set of actions may be repeated while the third VR scene is being viewed. The second VR scene may include a third portal. In response to a user interaction with the third portal, viewing of the second VR scene may end, and viewing of the third VR scene may begin.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
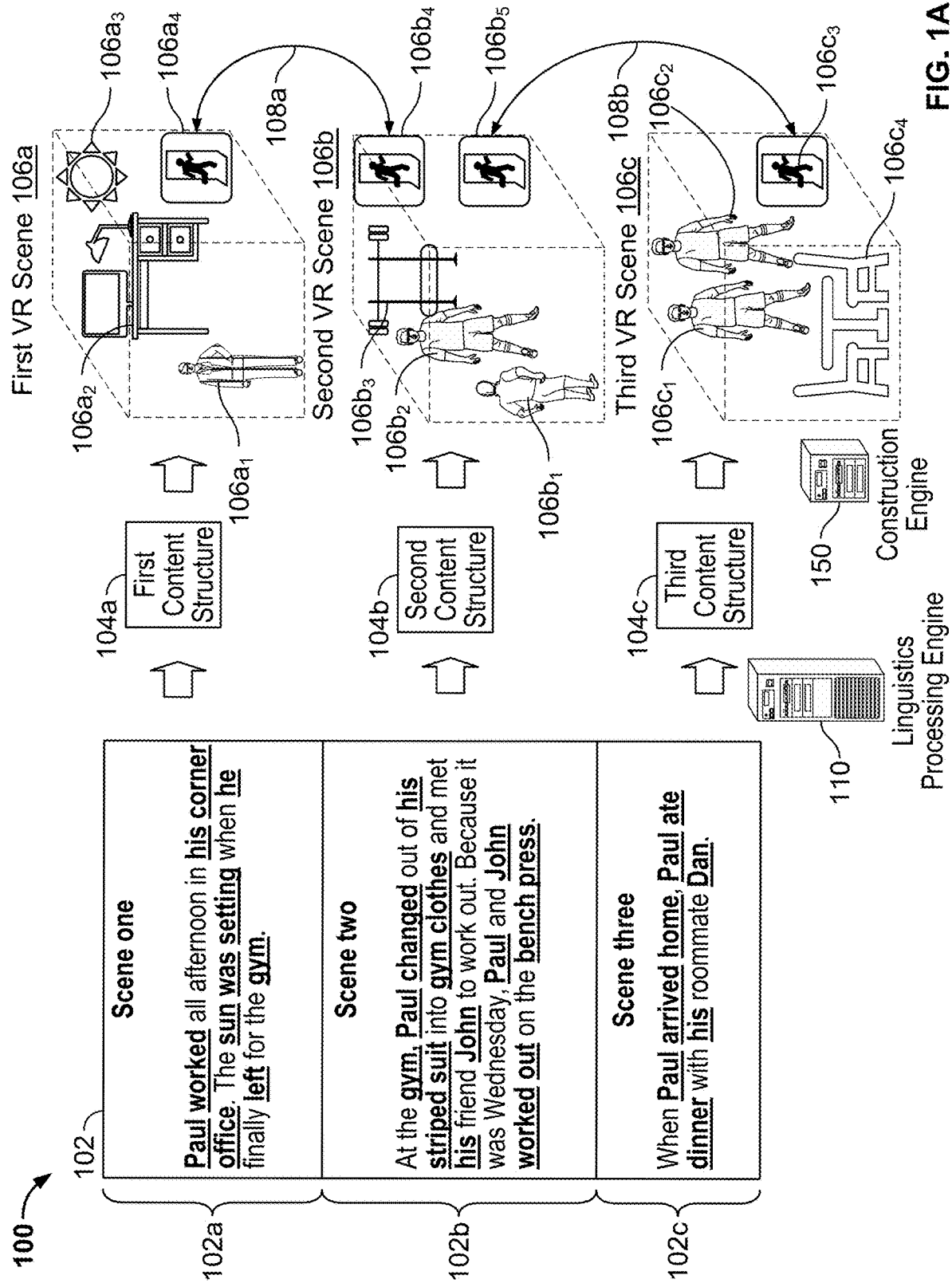
FIG. 1A shows an illustrative diagram for generating VR scenes from a textual document, in accordance with some embodiments of the disclosure.

FIG. 1A shows illustrative diagram 100 for generating VR scenes from a textual document, in accordance with some embodiments of the disclosure. In some embodiments, textual document 102 may be a book, a screenplay, a short story, etc. Textual document 102 may be in electronic form or converted to electronic form by optical character recognition techniques. In some embodiments, textual document 102 may be generated from a picture of text taken by a user (e.g., a picture of a page of a book). In some embodiments, textual document 102 may be generated from audio content (e.g., audiobook, podcast, etc.) using speech-to-text techniques. However, these are only examples, and textual document 102 may correspond to any text that a user wishes to view as a set of animated VR scenes.

Linguistics processing engine 110 (local and/or remote) may analyze the text from textual document 102. The analysis may include classifying words from the text as different parts of speech (nouns, related verbs, adjectives, etc.) using various techniques (e.g., as described by co-pending application Ser. No. 16/453,841 entitled "SYSTEMS AND METHODS FOR GENERATING SUPPLEMENTAL CONTENT FOR MEDIA CONTENT," filed on Jun. 26, 2019, which is hereby expressly incorporated by reference herein in its entirety). For example, as shown, linguistics processing engine 110 may parse textual document 102 to identify a plurality of text portions respectively corresponding to a plurality of scenes (102a, 102b, and 102c). Linguistics processing engine 110 may identify a scene as continuous actions, e.g., within a certain time, or location, or corresponding to an identified character. For example, linguistics processing engine 110 may identify scene changes between the plurality of scenes (102a, 102b, and 102c) based on a change of location. For example, as shown, linguistics processing 110 engine may identify a first text portion corresponding to "Scene one" 102a by identifying actions that occur at a first location (i.e., "Paul's corner office"), a second text portion corresponding to "Scene two" 102b by identifying actions that occur at a second location (i.e., "the gym"), and a third text portion corresponding to "Scene three" 102c by identifying actions that occur at a third location (i.e., "Paul's home"). However, this is only one example, and scenes/scene changes may be identified based on, e.g., the entry or exit of a character, time (e.g., the next day), or any other content. In some embodiments, textual document 102 itself or metadata associated with textual document 102 may indicate scenes/scene changes. In some embodiments, scenes/scene changes may be identified based on a certain amount of characters being identified, a certain number of actions being performed, a certain number of nouns being identified, etc.

Linguistics processing engine 110 may analyze the text portions corresponding to each of the plurality of scenes (102a, 102b, and 102c) to identify a first plurality of nouns and related verbs in each of the text portions. For example, as shown, linguistics processing engine 110 may identify the nouns "Paul" and "office" and the associated verb "worked" in the first sentence of the first text portion corresponding to scene one 102a. Similarly, as shown, linguistics processing engine 110 may identify the nouns "sun" and "he" (Paul) and associated verbs "was setting" and "left" in the second sentence of the first text portion corresponding to scene one 102a. Linguistics processing engine 110 may also identify words related to the identified nouns or verbs (e.g., the adjective "corner"). As described in greater detail below, linguistics processing engine 110 may match identified words with attribute entries in an attribute table to generate new content structures. For example, linguistics processing engine 110 may generate first content structure 104a based on the identified words in scene one 102a, as well as the identified words in other text portions. Similarly, linguistics processing engine 110 may generate second content structure 104b and third content structure 104c based on the identified words in scene two 102b and scene three 102c, respectively, as well as the identified words in other text portions. Construction engine 150 may generate first VR scene 106a, second VR scene 106b, and third VR scene 106c based on generated first content structure 104a, second content structure 104b, and third content structure 104c, respectively. As shown, a user may navigate between first VR scene 106a, second VR scene 106b, and third VR scene 106c using portals ($106a_4$, $106b_4$, $106b_5$, and $106c_4$) corresponding to paths 108a and 108b. Navigation between VR scenes will be explained in greater detail below with reference to FIG. 2.

Figure 1B:
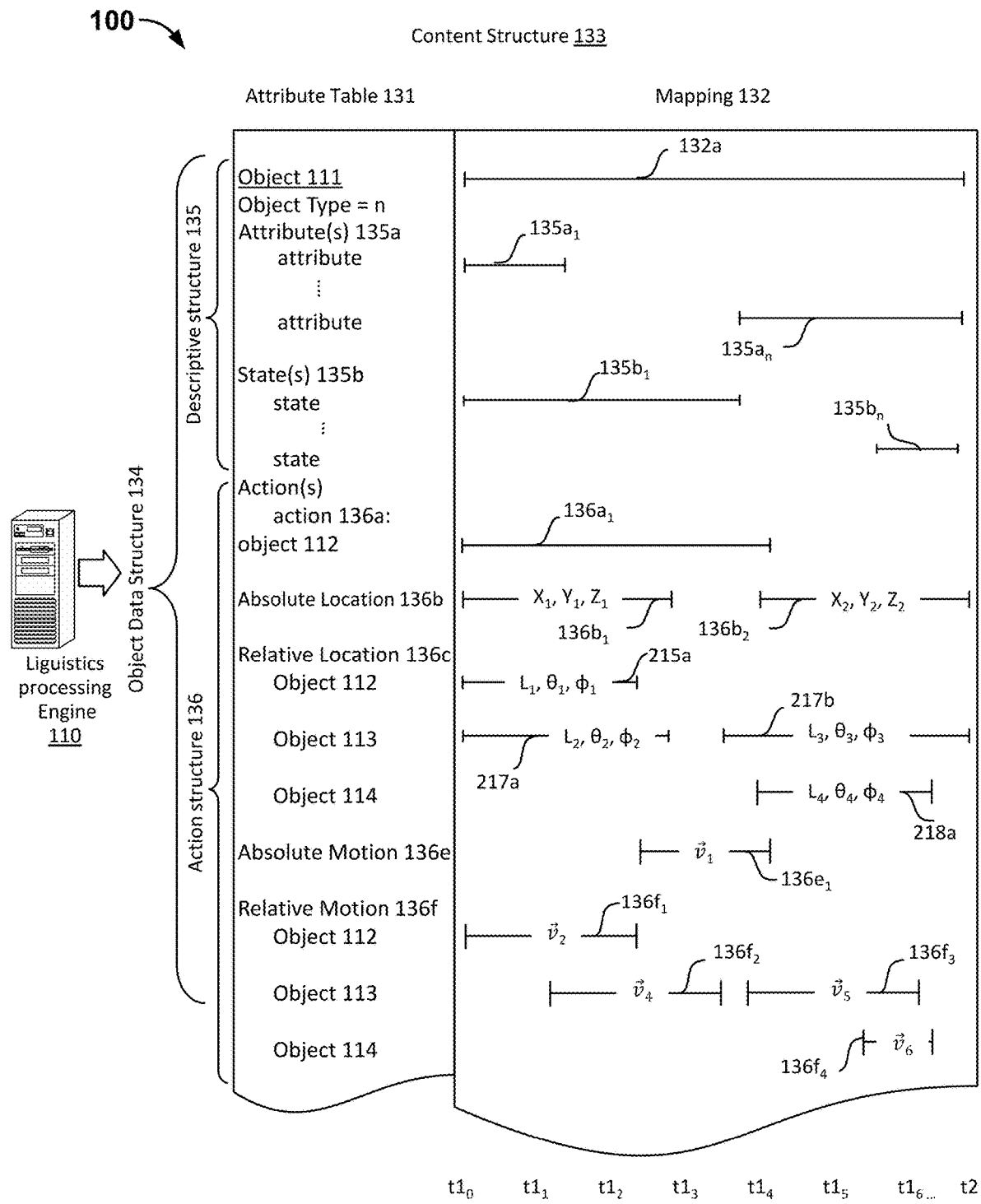
FIG. 1B shows an illustrative diagram of an exemplary content structure, in accordance with some embodiments of the disclosure.

FIG. 1B shows illustrative diagram 109 of an exemplary content structure, in accordance with some embodiments of the disclosure. Linguistics processing engine 110 interfaces with content structure 133, which includes attribute table 131 and mapping 132. Specifically, attribute table 131 may include object data structures 134 including attributes relating to an object. Object data structure 134 includes attribute table entries such as descriptive structure 135, action structure 136, an audio structure, etc. Attribute table entries may be attributes, states, actions, or other types of substructures within the attribute table. Descriptive structure 135 lists attributes such as object name, object type (e.g., work clothes, gym clothes, sleepwear, etc.), features 135a (e.g., work clothes object type: suit, blazer, tie, skirt, etc.), states 135b (e.g., in closet, being worn, dirty, clean, etc.). Features 135a and states 135b may include different attributes based on the object type. States 135b may include an emotional state, a motion state (e.g., taken off a hanger, put on a hanger, worn on body).

Action structure 136 is descriptive of actions that the object is performing on or to other objects. Action structure 136 lists action name/type 136a (e.g., being put on, being taken off, being worn by Paul, being worn by John, etc.), object(s) that the action involves absolute location 136b of the object with respect to the video frame, relative location 136c relative to other object(s), absolute motion 136e, relative motion 136f, etc. Mapping 132b corresponding to action attribute 136a may include a value indicative of a rate or a degree at which the action in taking place (e.g., being taken off "slowly," "feverishly," "quickly," etc.).

Similarly, mapping 132 further shows action mapping $136a_1$, absolute location mappings $136b_{1-2}$, relative location mappings 215a, 217a, 217b and 218a, absolute motion mapping $136e_1$, relative motion mapping $136f_{1-4}$, setting mappings, and setting feature mappings. In some embodiments, the mapping may be temporal, locational, or other value-based values corresponding to a specific objection, action, state, or attribute. In some embodiments, the mapping may be independent of the specific object, action, state, or attribute. For example, the mapping may be of a general phenomenon independent of a corresponding object/action. Instead, any object within the proximity of that phenomenon may receive the respective mapping.

As previously mentioned, exemplary content structures that can be used for generating new content structures are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

Figure 1C:
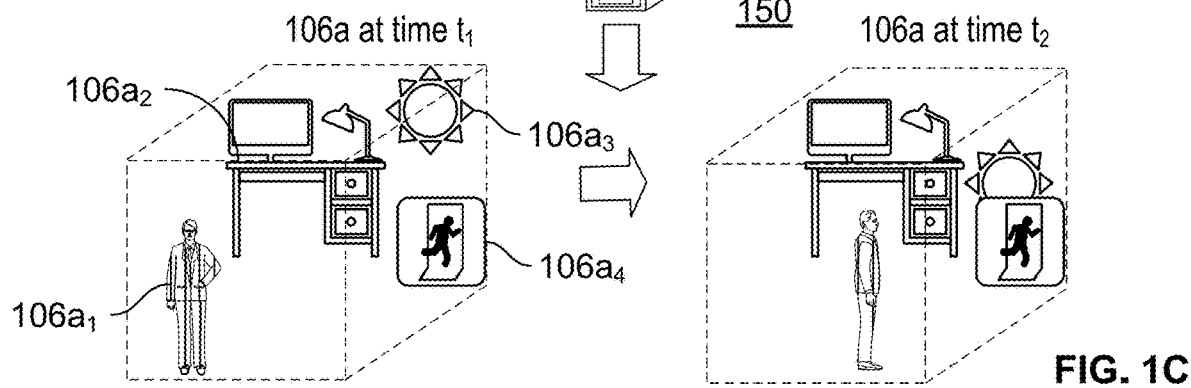
FIG. 1C shows an illustrative diagram for specific attribute table selections from a content structure, in accordance with some embodiments of the disclosure.

FIG. 1C shows illustrative diagram 121 for specific attribute table selections from a content structure, in accordance with some embodiments of the disclosure. Linguistics processing engine 110 may search a plurality of content structures for a content structure that comprises a matching object with an object name that matches the noun. Each of the content structures may include one or more objects. Each of the objects may include one or more attributes. For example, referring to scene one 102a example, content structure 133 includes object 111 with the object name "office." Attribute table 131 includes attribute table entries, namely, attributes of the "office" (132a) are "Desk" $135a_1$, "Lamp" $135a_2$, "Computer" $135a_3$, in the state "stationary" $135a_4$. Content structure 133 further includes object 112 with the object name "Paul." Attributes of "Paul" are "Person" $135b_1$, "Clothing: striped suit" $135b_1$," and "Accessories: phone" $135b_3$, in the state "standing" $135b_4$, and actions "moving away from desk" $135b_5$ and "talking on phone" $135b_6$. Content structure 133 further includes object 113 with the object name "sun." States of the "sun" are "shining" $135c_1$ and "setting" $135c_2$, and action is "moving down in the sky" $135c_3$. Content structure 133 further includes object 114 with the object name "first portal," in the state "stationary" $135d_1$. In some embodiments, there may be more objects and more attributes and mappings for each object than shown.

Linguistics processing engine 110 may match identified words with attribute entries in attribute table 131 (or determine approximate attribute table entries in the case of no exact match) to generate a new content structure including matching objects, but excluding non-matching attribute table entries. For example, content structure 133 may correspond to content structure 104a in FIG. 1A. Construction engine 150 may generate for output a VR scene (e.g., content segment) based on the new content structure. In some embodiments, construction engine 150 may also generate for output 2D content based on the new content structure. For example, as shown, construction engine 150 may generate first VR scene 106a from times $t_1$-$t_2$. First VR scene 106a may include a plurality of VR objects depicted as performing a set of actions from times $t_1$-$t_2$. For example, as shown, VR object $106a_1$ may depict Paul working in his corner office, talking on his phone, and walking away from his desk having a computer and a lamp disposed thereon (i.e., object $106a_2$). VR object $106a_3$ may depict the sun moving down in the sky until it sets at time $t_2$ when "Paul" is leaving his office (for the gym). First VR scene 106a may also include VR object $106a_4$ depicting a portal that a user can interact with to go to another VR scene (e.g., second VR scene 106b). Portales for traveling between VR scenes is described in greater detail below.

Returning to FIG. 1A, construction engine 150 may generate second VR scene 106b (e.g., from times $t_2$-$t_3$) and third VR scene 106c (e.g., from times $t_3$-$t_n$) in a manner similar to that described above. As shown, second VR scene 106b may include VR objects $106b_1$, $106b_2$, $106b_3$, $106b_4$, and $106b_5$, and third VR scene 106c may include VR objects $106c_1$, $106c_2$, $106c_3$, and $106c_4$. A user may navigate between first VR scene 106a, second VR scene 106b, and third VR scene 106c along pathway 108a connecting first portal $106a_4$ in first VR scene 106a and second portal $106b_4$ in second VR scene 106b, and along pathway 108b connecting third portal $106b_5$ in second VR scene 106b and fourth portal $106c_4$ in third VR scene 106c. For example, if a user is viewing the first VR scene 106a but wishes to stop viewing the first VR scene 106a and instead view the second VR scene 106b, the user may select, via a user interface, first portal $106a_4$. In response to the user selection, second VR scene 106b may be presented to the user. User selection and interaction with a user interface is described are greater detail below with reference to FIG. 3.

As previously mentioned, exemplary content structures that can be used for generating new content structures and rendering them into an animated visual content segment (e.g., a VR scene) are described by co-pending application Ser. No. 16/363,919 entitled "SYSTEMS AND METHODS FOR CREATING CUSTOMIZED CONTENT," filed on Mar. 25, 2019; co-pending application Ser. No. 16/451,823 entitled "SYSTEMS AND METHODS FOR CREATING CUSTOMIZED CONTENT," filed on Jun. 25, 2019; co-pending application Ser. No. 16/453,841 entitled "SYSTEMS AND METHODS FOR GENERATING SUPPLEMENTAL CONTENT FOR MEDIA CONTENT," filed on Jun. 26, 2019; and co-pending application Ser. No. 16/517,322 entitled "SYSTEMS AND METHODS FOR GENERATING CONTENT FOR A SCREENPLAY," filed on Jul. 19, 2019, which are hereby expressly incorporated by reference herein in their entirety.

Figure 2:
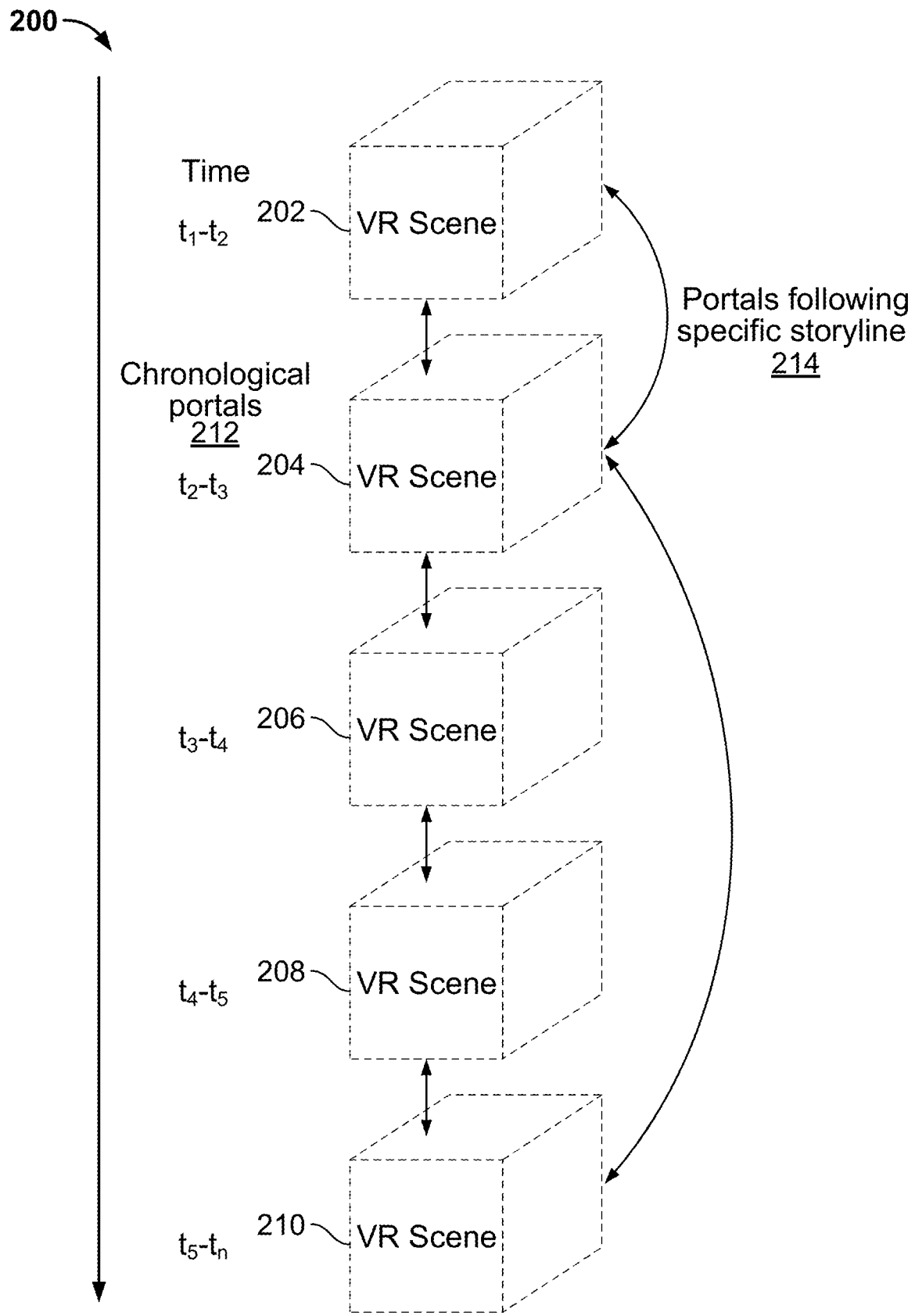
FIG. 2 shows an illustrative diagram for navigating between VR scenes, in accordance with some embodiments of the disclosure.

FIG. 2 shows an illustrative diagram 200 for navigating between VR scenes, in accordance with some embodiments of the disclosure. As shown, illustrative diagram 200 includes five VR scenes (202, 204, 206, 208, and 210) arranged in chronological order (e.g., with respect to the text in the textual document they are generated from). In some embodiments, each of the five VR scenes may include at least one portal that a user may interact with to travel to an adjacent scene with respect to time (e.g., chronological portals 212). For example, VR scene 202 may include a single portal allowing a user to travel to the next scene (VR scene 204), while VR scene 204 may include multiple portals allowing a user to travel to VR scene 202 or VR scene 206. In some embodiments, certain ones of the five VR scenes may include at least one portal (e.g., portals 214) for traveling to scenes corresponding to a specific storyline. Storylines are narratives that, along with other narratives, make up a plot of a story. For example, a user may wish to follow the storyline of a particular character who appears in VR scenes 202, 204, and 210, but who does not appear in VR scenes 206 and 208. Thus, VR scenes 202, 204, and 210 may include at least one portal that a user may interact with to travel to adjacent scenes in a particular storyline. In some embodiments, the user may select a particular storyline in advance (e.g., through a user interface). In some embodiments, a user may select a particular VR object in a VR scene and request to view all the VR scenes including that particular VR object. Thus, portals may be generated dynamically or in advance. In some embodiments, storylines may be generated automatically by searching the content structures corresponding to each scene. For example, a storyline may be generated by identifying all the content structures that include a particular character (corresponding to a particular VR object). In some embodiments, if a user selects a storyline including only certain VR scenes of a plurality of VR scenes, only the certain VR scenes may be generated for display (and/or transmitted to the device displaying the certain VR scenes from a server), thereby reducing the amount of processing or transmitting resources required to generate and display the certain VR scenes.

In some embodiments, the set of actions being performed by the VR objects in a VR scene may be repeated until the user leaves the scene. In some embodiments, the set of actions being performed by the VR objects in the VR scene may be played only once or repeatably until the user leaves the scene. In some embodiments, audio corresponding to the VR scene that is being viewed (e.g., the corresponding text of the textual document) may be generated for output to a user while the user is viewing the VR scene. For example, referring to FIG. 1A, audio generated from the first text portion corresponding to scene one 102a could be played while first VR scene 106a is being viewed.

Figure 3:
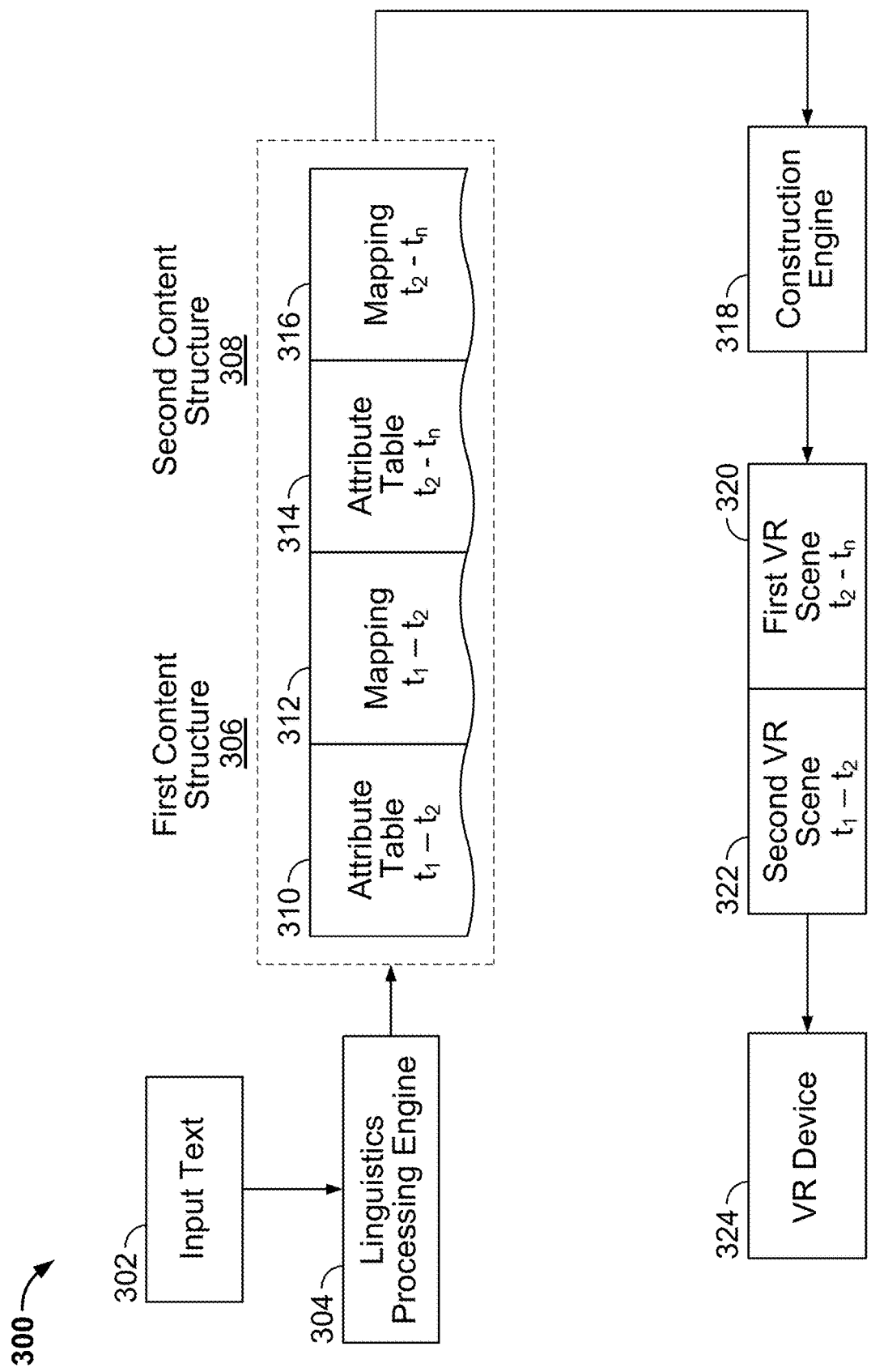
FIG. 3 shows an illustrative system diagram for generating, from input text, VR scenes for display on a VR device, in accordance with some embodiments of the disclosure.
Figure 4A:
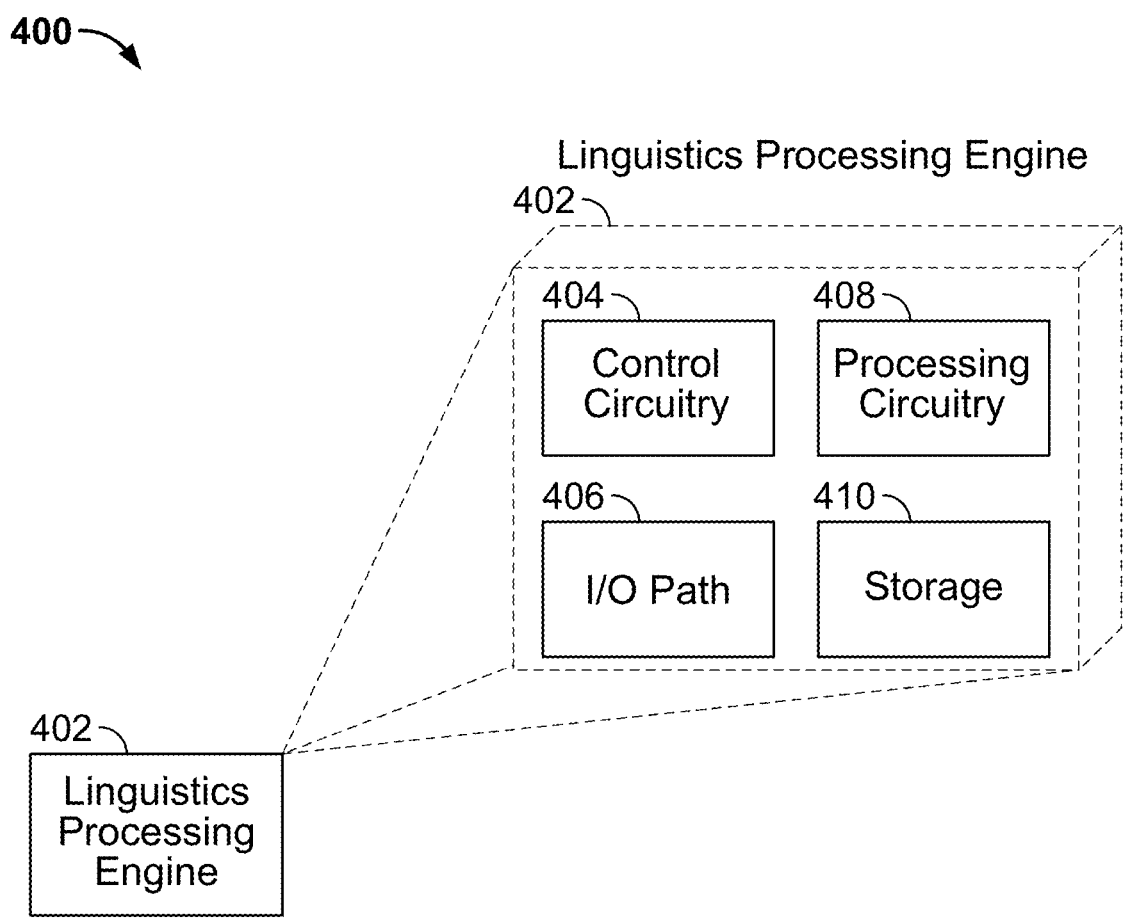
FIG. 4A shows an illustrative block diagram of a linguistics processing engine, in accordance with some embodiments of the disclosure.
Figure 4B:
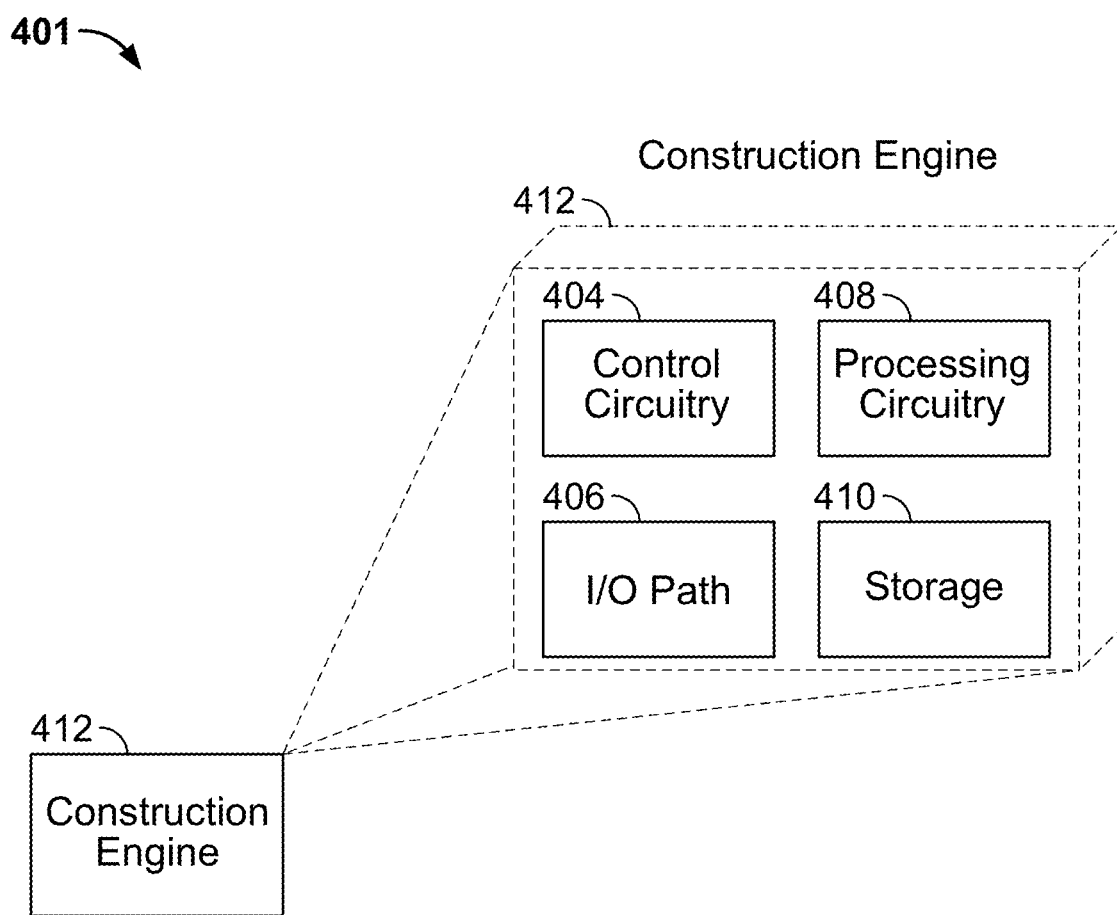
FIG. 4B shows an illustrative block diagram of a construction engine, in accordance with some embodiments of the disclosure.

FIG. 3 shows illustrative system diagram 300 for generating, from input text, VR scenes for display on a VR device, in accordance with some embodiments of the disclosure. As shown, system diagram 300 includes linguistics processing engine 304, content structures 306 and 308, construction engine 318, VR scenes 320 and 322, and VR device 324. In some embodiments, VR device 324 may be any device including a screen for displaying content. Linguistics processing engine 304 may be any hardware that provides for processing and transmit/receive functionality. Linguistics processing engine 304 may receive input text 302 from a device or memory that linguistics processing engine 304 is communicatively coupled to. Linguistics processing engine 304 may search for a content structure that includes matching objects and attribute table entries (as described above). For example, linguistics processing engine 304 may access a content structure as described with reference to FIG. 1B. The content structure may be integrated into linguistics processing engine 304, construction engine 318, and/or VR device 324. In some embodiments, the accessed content structures may be communicatively coupled to both linguistics processing engine 304 and construction engine 318. Linguistics processing engine 304 may generate new content structures (e.g., first content structure 306 and second content structure 308) including the matching objects and attribute table entries (e.g., attribute tables 310 and 314 and mappings 312 and 316). A further detailed disclosure on linguistics processing engine 304 can be seen in FIG. 4A showing an illustrative block diagram of the linguistics processing engine, in accordance with some embodiments of the disclosure. Additionally, a further detailed disclosure on the construction engine can be seen in FIG. 4B showing an illustrative block diagram of the construction engine, in accordance with some embodiments of the disclosure.

In some embodiments, linguistics processing engine 304 may be implemented remote from VR device 324, such as from a cloud server configuration. Linguistics processing engine 304 may be any device for retrieving information (e.g., from VR device 324 or any other device or memory that provides textual content for generating content structures) and identifying and/or parsing textual and other information from media content. Linguistics processing engine 304 may be implemented by a VR device (e.g., a VR headset), a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, Internet-of-Things device, wearable device, or wireless device, and/or combination of the same. Any of the system modules (e.g., linguistics processing engine 304, construction engine 318, VR device 324, etc.) may be any combination of shared or disparate hardware pieces that are communicatively coupled.

In some embodiments, construction engine 318 may be implemented remote linguistics processing engine 304 and VR device 324 such as in a cloud server configuration. Construction engine 318 may be any device for generating first VR scene 320 and second VR scene 322 based on first content structure 306 and second content structure 308, as described above. Construction engine 318 may be implemented by a VR device (e.g., a VR headset), a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, Internet-of-Things device, wearable device, or wireless device, and/or combination of the same.

In some embodiments, linguistics processing engine 304 and construction engine 318 may be implemented within a single local device. In other embodiments, linguistics processing engine 304, construction engine 318, and VR device 324 may be implemented within a single local device (e.g., a VR headset).

VR device 324 may be any device having an interface to play VR content and interact with VR content (e.g., voice controls, gesture controls, location sensors, eye sensors, accelerometers, keyboard, touchscreen speakers, or any other similar interfaces). For example, if VR device 324 is implemented by a VR headset, the VR headset may sense user movements to display and control content. For example, returning to FIG. 1A, a user may navigate from first VR scene 106a to second VR scene 106b using a voice control (e.g., "select first portal"), a hand gesture (e.g., by a VR hand displayed in the VR environment that corresponds to the user's hand), user movement (e.g., by a VR user's movements displayed in the VR environment that corresponds to the user's movements in a physical environment), etc. However, this is only one example, and VR device 324 may also be implemented by a computer, a mobile telephone, a portable video player, a portable music player, a portable gaming machine, a smartphone, or any other television equipment, computing equipment, Internet-of-Things device, wearable device, or wireless device, and/or combination of the same.

First VR scene 320 and second VR scene 322 (i.e., content segments) may be any data or information that is generated by construction engine 318. First VR scene 320 and second VR scene 322 may be transmitted by construction engine 318 to VR device 324.

FIG. 4A shows illustrative block diagram 400 of linguistics processing engine 402, in accordance with some embodiments of the disclosure. In some embodiments, linguistics processing engine 402 may be communicatively connected to a user interface. In some embodiments, linguistics processing engine 402 may include processing circuitry, control circuitry, and storage (e.g., RAM, ROM, hard disk, removable disk, etc.). Linguistics processing engine 402 may include an input/output (I/O) path 406. I/O path 406 may provide device information, or other data, over a local area network (LAN) or wide area network (WAN), and/or other content and data to control circuitry 404, which includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a linguistics processing engine stored in memory (e.g., storage 410).

Memory may be an electronic storage device provided as storage 410, which is part of control circuitry 404. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Nonvolatile memory may also be used (e.g., to launch a boot-up routine and other instructions).

Linguistics processing engine 402 may be coupled to a communications network. The communications network may be one or more networks including the Internet, a mobile phone network, mobile voice or data network (e.g., a 5G, 4G or LTE network), mesh network, peer-to-peer network, cable network, or other types of communications network or combination of communications networks. Linguistics processing engine 402 may be coupled to a secondary communications network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

FIG. 4B shows illustrative block diagram 401 of construction engine 412, in accordance with some embodiments of the disclosure. Construction engine 412 may perform each of the operations individually or collaboratively. In some embodiments, construction engine 412 may be communicatively connected to a user interface. In some embodiments, the construction engine may include processing circuitry, control circuitry, and storage (e.g., RAM, ROM, hard disk, removable disk, etc.), as described above with reference to FIG. 4A. Construction engine 412 may include an input/output path 406. Construction engine 412 may be coupled to a communications network.

Figure 5:
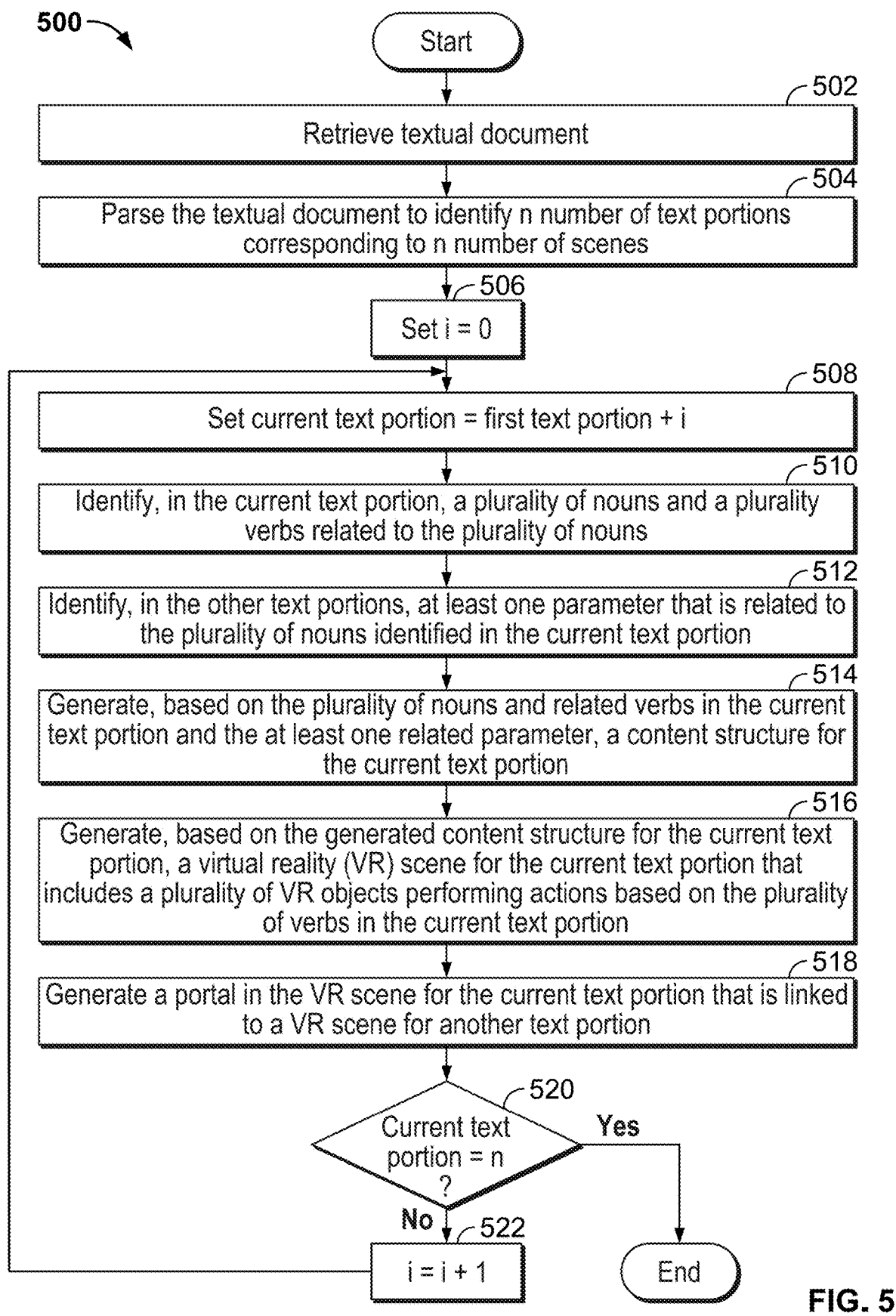
FIG. 5 is an illustrative flowchart of a process for generating VR scenes from a textual document, in accordance with some embodiments of the disclosure.

FIG. 5 is an illustrative flowchart of process 500 for generating VR scenes from a textual document, in accordance with some embodiments of the disclosure. Process 500, and any of the following processes, may be executed by control circuitry 404 (e.g., in a manner instructed to control circuitry 404 by linguistics processing engine 402 and/or construction engine 412). Control circuitry 404 may be part of a network optimizer, or of a remote server separated from the network optimizer by way of a communications network, or distributed over a combination of both.

At 502, linguistics processing engine 402, by control circuitry 404 (e.g., via I/O path 406), may receive a textual document. In some embodiments, linguistics processing engine 402 may receive audio content or visual content and convert the received content into machine-readable text.

At 504, linguistics processing engine 402, by control circuitry 404, may parse the textual document to identify n number of text portions corresponding to n number of scenes. For example, linguistics processing engine 402 may divide the textual document into a plurality of separate scenes.

At 506, linguistics processing engine 402, by control circuitry 404, may set a first counter equal to zero (e.g., i=0).

At 508, linguistics processing engine 402, by control circuitry 404, may set second counter corresponding to the current text portion that is to be analyzed to the first text portion (e.g., the first identified scene of the identified scenes) plus the value of the first counter.

At 510, linguistics processing engine 402, by control circuitry 404, may identify, in the current text portion (i.e., identified by the value of the second counter), a plurality of nouns and a plurality of verbs related to the plurality of nouns. Control circuitry 404 may also identify, in the current text portion, other words related to the identified plurality of nouns or verbs (e.g., adjective, adverbs, etc.).

At 512, linguistics processing engine 402, by control circuitry 404, may identify, in other text portions, at least one parameter that is related to the plurality of nouns identified in the current text portion. For example, referring to FIG. 1A, the "striped suit" identified in scene two 102b, may be identified as being related to "Paul" in scene one 102a (e.g., the current scene being analyzed).

At 514, linguistics processing engine 402, by control circuitry 404, may generate, based on the plurality of nouns and related verbs in the current text portion and the at least one related parameter, a content structure for the current text portion. In some embodiments, if no related parameter is identified, the content structure may be based only on the words in the current text portion. In some embodiments, metadata associated with the textual documents may be included in the content structure.

At 516, construction engine 412, by control circuitry 404, may generate, based on the generated content structure for the current text portion, a VR scene for the current text portion that includes a plurality of VR objects performing actions based on the plurality of verbs in the current text portion. That is, control circuitry 404 may generate animated content corresponding to the current text portion.

At 518, construction engine 412, by control circuitry 404, may generate a portal in the VR scene for the current text portion that is linked to a VR scene for another text portion. In some embodiments, the portal may be linked to the next chronological scene. In some embodiments, the portal may be linked to the next scene in a particular storyline. In some embodiments, a VR scene may have a plurality of portals respectively linked to a plurality of VR scenes to allow a user to easily switch between scenes in the VR environment.

At 520, linguistics processing engine 402, by control circuitry 404, may determine if the current text portion (for which the VR scene was generated) is the last text portion identified in the textual document (e.g., current text portion=n?). That is, control circuitry 404 may determine if all of text portions identified in the textual document have been analyzed. If control circuitry determines that the current text portion is the last text portion identified in the textual document ("Yes" at 520), process 500 may end. Otherwise ("No" at 520), process 500 may proceed to 522.

At 522, linguistics processing engine 402, by control circuitry 404, may increment the first counter by one (e.g., i=i+1) and return to 508, where the current text portion is incremented to the next identified text portion, and the process is repeated until a VR scene has been generated for each of the identified text portions.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 1A-1C, 3, 4A, and 4B could be used to perform one or more of the steps in FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   parsing a textual document to identify a first text portion corresponding to a first scene and a second text portion corresponding to a second scene;
   identifying a first plurality of nouns referenced the first text portion, and a first plurality of verbs related to the first plurality of nouns;
   identifying a second plurality of nouns referenced the second text portion, and a second plurality of verbs related to the second plurality of nouns;
   generating, based on the first plurality of nouns, a first virtual reality (VR) scene that comprises a first plurality of VR objects, wherein the first plurality of objects is depicted as performing a first set of actions based on the first plurality of verbs; and
   generating, based on the second plurality of nouns, a second VR scene that comprises a second plurality of VR objects, wherein the second plurality of objects is depicted as performing a second set of actions based on the second plurality of verbs,
   wherein:
   if the first VR scene is still being viewed when the first VR scene ends, the first set of actions are repeated beginning from a start of the first VR scene;
   the first VR scene comprises a first portal, wherein in response to a user interaction with the first portal, viewing of the first VR scene ends, and viewing of the second VR scene begins; and
   if the second VR scene is still being viewed when the second VR scene ends, the second set of actions are repeated beginning from a start of the second VR scene.

2. The method of claim 1, wherein the second VR scene comprises a second portal, wherein in response to a user interaction with the second portal, viewing of the second VR scene ends, and viewing of the first VR scene begins.

3. The method of claim 1, further comprising identifying a parameter referenced in the second text portion which corresponds to one of the plurality of first nouns,
wherein the generating the first VR scene is further based on the identified parameter.

4. The method of claim 1, further comprising identifying an adjective associated with one of the first plurality of nouns,
wherein the generating the first VR scene is further based on the identified adjective.

5. The method of claim 1, further comprising generating a first content structure comprising a first object that matches a first one of the first plurality of nouns, wherein the first object comprises a first plurality of attribute table entries based on a second one of the first plurality of nouns and the first plurality of verbs.

6. The method of claim 5, wherein the first plurality of attribute table entries is further based on at least one of a first one of the second plurality of nouns and a first one of the second plurality of verbs.

7. The method of claim 6, wherein the generating the first VR scene comprises generating the first VR scene based on the first content structure.

8. The method of claim 2, further comprising:
parsing the textual document to identify a third text portion corresponding to a third scene;
identifying a third plurality of nouns referenced in the third text portion, and a third plurality of verbs related to the third plurality of nouns; and
generating, based on the third plurality of nouns, a third VR scene that comprises a third plurality of VR objects, wherein the third plurality of VR objects is depicted as performing a third set of actions based on the third plurality of verbs,
wherein if the third VR scene is still being viewed when the third VR scene ends, the third set of actions are repeated beginning from a start of the third VR scene.

9. The method of claim 7, wherein the second VR scene comprises a third portal, wherein in response to a user interaction with the third portal, viewing of the second VR scene ends, and viewing of the third VR scene begins.

10. A system comprising:
control circuitry configured to:
parse a textual document to identify a first text portion corresponding to a first scene and a second text portion corresponding to a second scene;
identify a first plurality of nouns referenced the first text portion, and a first plurality of verbs related to the first plurality of nouns;
identify a second plurality of nouns referenced the second text portion, and a second plurality of verbs related to the second plurality of nouns;
generate, based on the first plurality of nouns, a first virtual reality (VR) scene that comprises a first plurality of VR objects, wherein the first plurality of objects is depicted as performing a first set of actions based on the first plurality of verbs; and
generate, based on the second plurality of nouns, a second VR scene that comprises a second plurality of VR objects, wherein the second plurality of objects is depicted as performing a second set of actions based on the second plurality of verbs,
wherein:
if the first VR scene is still being viewed when the first VR scene ends, the first set of actions are repeated beginning from a start of the first VR scene;
the first VR scene comprises a first portal, wherein in response to a user interaction with the first portal, viewing of the first VR scene ends, and viewing of the second VR scene begins; and
if the second VR scene is still being viewed when the second VR scene ends, the second set of actions are repeated beginning from a start of the second VR scene.

11. The system of claim 10, wherein the second VR scene comprises a second portal, wherein in response to a user interaction with the second portal, viewing of the second VR scene ends, and viewing of the first VR scene begins.

12. The system of claim 10, wherein the control circuitry is further configured to identify a parameter referenced in the second text portion which corresponds to one of the plurality of first nouns, and
wherein the control circuitry is further configured, when generating the first VR scene, to generate the first VR scene based on the identified parameter.

13. The system of claim 10, wherein the control circuitry is further configured to identify an adjective associated with one of the first plurality of nouns,
wherein the control circuitry is further configured, when generating the first VR scene, to generate the first VR scene based on the identified adjective.

14. The system of claim 10, wherein the control circuitry is further configured to generate a first content structure comprising a first object that matches a first one of the first plurality of nouns,
wherein the first object comprises a first plurality of attribute table entries based on a second one of the first plurality of nouns and the first plurality of verbs.

15. The system of claim 14, wherein the first plurality of attribute table entries is further based on at least one of a first one of the second plurality of nouns and a first one of the second plurality of verbs.

16. The system of claim 15, wherein the control circuitry is further configured, when generating the first VR scene, to generate the first VR scene based on the first content structure.

17. The system of claim 11, wherein the control circuitry is further configured to:
parse the textual document to identify a third text portion corresponding to a third scene;
identify a third plurality of nouns referenced in the third text portion, and a third plurality of verbs related to the third plurality of nouns; and
generate, based on the third plurality of nouns, a third VR scene that comprises a third plurality of VR objects, wherein the third plurality of VR objects is depicted as performing a third set of actions based on the third plurality of verbs,
wherein if the third VR scene is still being viewed when the third VR scene ends, the third set of actions are repeated beginning from a start of the third VR scene.

18. The system of claim 16, wherein the second VR scene comprises a third portal, wherein in response to a user interaction with the third portal, viewing of the second VR scene ends, and viewing of the third VR scene begins.

* * * * *